A. J. SANFORD.
MOLDING APPARATUS FOR GLASS CANDLESTICKS.
APPLICATION FILED JUNE 24, 1913.
1,236,606.
Patented Aug. 14, 1917.
2 SHEETS—SHEET 2.
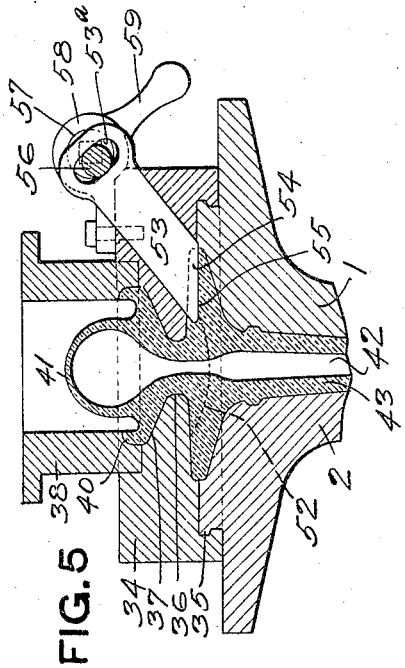
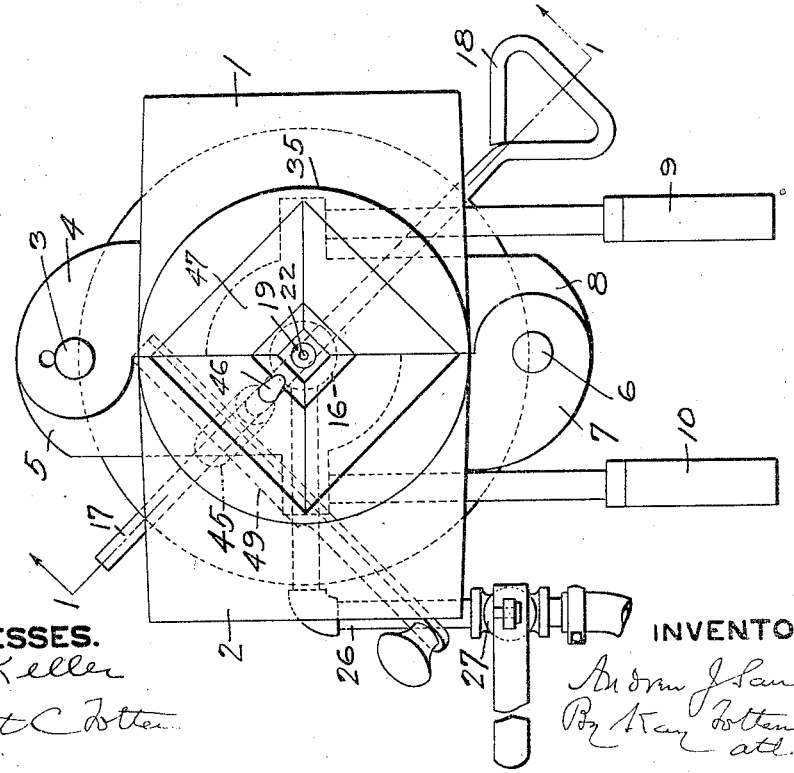
WITNESSES.
J. R. Keller
Robert C. Totten
INVENTOR.
Andrew J. Sanford
By Kay Totten & Pounds
attorneys

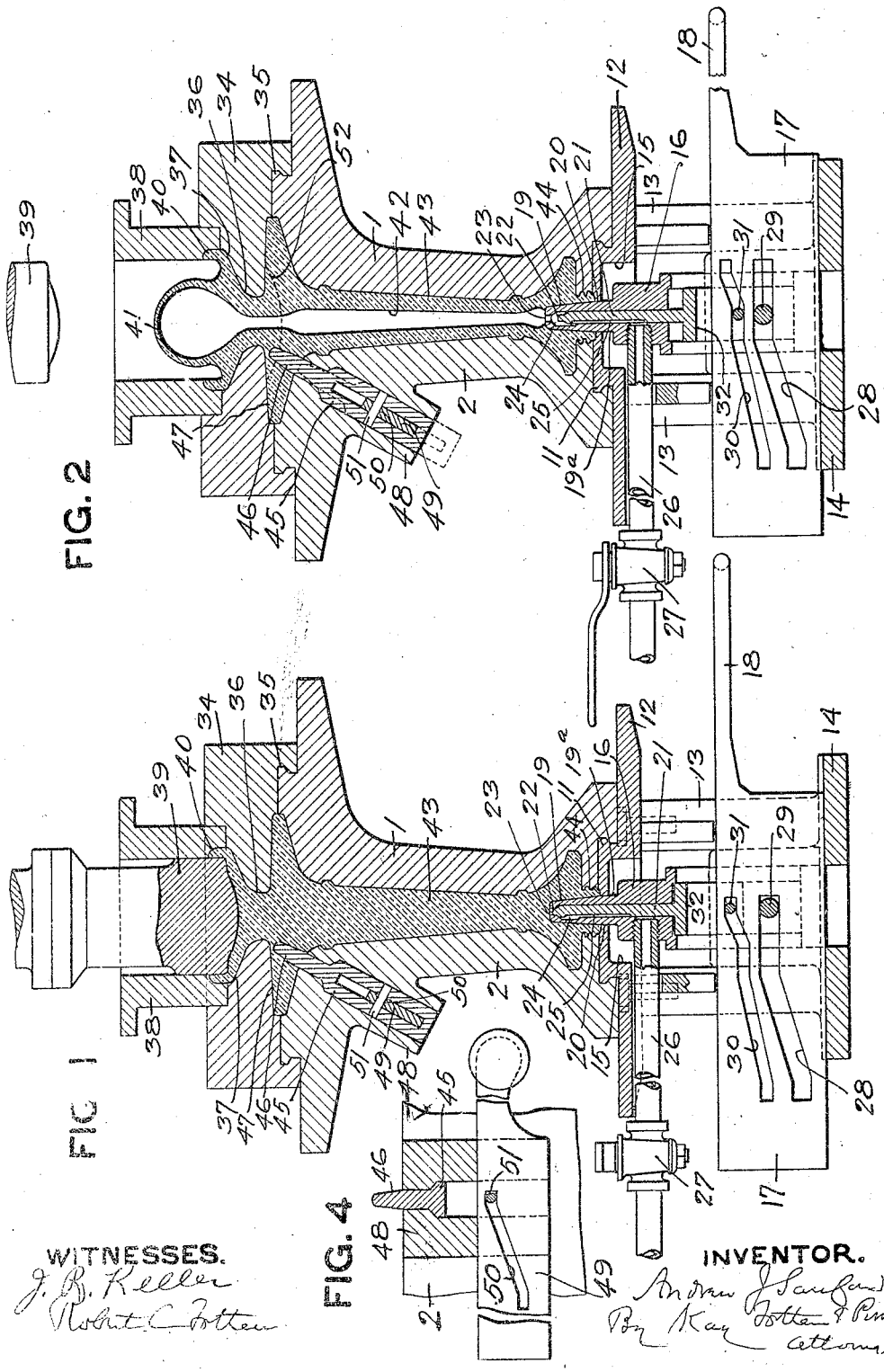

UNITED STATES PATENT OFFICE.

ANDREW J. SANFORD, OF NEWARK, OHIO, ASSIGNOR TO A. H. HEISEY & CO., OF NEWARK, OHIO, A COPARTNERSHIP.

MOLDING APPARATUS FOR GLASS CANDLESTICKS.

1,236,606. Specification of Letters Patent. Patented Aug. 14, 1917.

Application filed June 24, 1913. Serial No. 775,601.

*To all whom it may concern:*

Be it known that I, ANDREW J. SANFORD, a citizen of the United States, and resident of Newark, in the county of Licking and State of Ohio, have invented a new and useful Improvement in Molding Apparatus for Glass Candlesticks; and I do hereby declare the following to be a full, clear, and exact description thereof.

My invention relates to apparatus for molding and blowing glass articles, and is particularly, though not exclusively, concerned with apparatus of this character for providing a glass candlestick with a suitable passage for the reception of an electric conductor whereby the candlestick or standard may be used as the standard of an electric light. The arrangement of the electric conductor is such as to more or less conceal the conductor within the candlestick and to make the electrical connection as little prominent as possible. The invention is particularly concerned with means for blowing a passage longitudinally of the candlestick and providing connection of such passage with the outside of the candlestick in the most expeditious and economical manner possible.

With these and other objects in view, as will appear from the following description, the invention consists in the construction and arrangement of parts, one embodiment of which is illustrated in the accompanying drawings, in which Figure 1 is a longitudinal sectional view, parts being in elevation, through the molding apparatus on the line 1—1 Fig. 3; Fig. 2 is a view similar to Fig. 1 showing the parts in different operative position; Fig. 3 is a plan view of the apparatus; Fig. 4 is a fragmentary sectional view of certain details of construction; Fig. 5 is a fragmentary view similar to Figs. 1 and 2 of a modified form of the apparatus; Fig. 6 is a longitudinal sectional view of the form of article produced by the apparatus shown in Figs. 1 to 4 inclusive; Fig. 7 is a similar view of an article produced by the apparatus illustrated in Fig. 5.

In the manufacture of candlesticks which are to be employed as electroliers, difficulty has been experienced in connecting the electric conductors to the lamp in a manner which will present a sightly appearance which at the same time is economical with respect to the construction of the standard of the candlestick. As heretofore constructed, such candlesticks have been molded in hollow form and a lead passage from the exterior to the interior of the candlestick is afterward formed. The production of a candlestick of such form requires considerable expenditure of time and results in an article of more or less unsightly appearance.

The object of this invention therefore is to overcome these objectionable features and consists, generally stated, in the molding of the exterior shape of the candlestick and while the article is still in the mold, blowing a passage longitudinally of the body of the article while the glass is still in a partially molten state and also forming a passage from the interior bore of the article to the outer surface through which the conductors may be readily threaded.

Referring to Figs. 1 to 3, inclusive, 1 and 2 indicate the halves of a sectional glass mold, said sections being pivoted together upon a pin 3 passing through the hinge lugs 4 and 5, while the opposite sides of the molds are secured together by means of a pintle 6 passing through similar lugs 7 and 8. Each mold section may, as usual, be provided with convenient handles 9 and 10.

In assembling the mold, the main mold sections 1 and 2 are closed about a ring-like portion 11 projecting upwardly from the bottom plate 12 of the mold. This bottom plate is carried by suitable standards 13 which may be attached to a mold table 14 or other suitable support. Within a chamber 15 in the bottom plate and standard of the mold is slidably mounted a valve head 16, transversely slotted to receive a valve actuating draw bar 17 having a convenient handle 18. The main valve head 16 is provided with a nozzle 19 which projects through and fits closely within an aperture 20 in the ring portion of the bottom plate 12. This nozzle 19 is tapered for the portion of its length which projects normally above the ring portion 11. Within the valve head is mounted a valve stem 21 having a closing portion 22 adapted to close the aperture 23 of the valve head. This aperture 23 communicates with a chamber 24 in the valve head which in turn is adapted to communicate with a passage 25 in the valve stem 21 leading to the air inlet pipe 26. Said pipe is provided with a suitable cock 27 by which the admission of the air may be regulated and controlled.

The valve actuating draw bar 17 is provided with a cam slot 28 through which passes a pin 29 fixed to the valve head 16. Likewise the draw bar is provided with a second cam slot 30 through which passes a pin 31 extending transversely of a slot 32 of the base of the valve stem 21. From an inspection of Figs. 1 and 2, it will be seen that when the draw bar is in normal closing position as shown in Fig. 1, the pins 29 and 31 of the valve head and valve stem respectively are held in such position by the slots 28 and 30 of the draw bar as to hold the valve head 16 in elevated position causing its nozzle to project well into the mold cavity of the mold sections 1 and 2, and holding the straight portion 19ᵃ in a position to effectually close the aperture 20 in the ring portion 11 of the base plate of the mold. Likewise the pin 31 of the valve stem 20 is held in such position as to cause the closing end 22 of the valve stem to effectually close the aperture 23 of the valve head nozzle.

Mounted upon the top of the main mold sections after the mold has been closed is the top font 34 also formed in sections hinged together, so that it may be closed to the raised ring-like portions 35 of the mold section and thus held accurately in register with the molding cavities in said section. This top font is provided with a neck opening 36 which expands as at 37 to communicate with the plunger guide and filling ring 38 which ring is adapted to receive the usual plunger 39. The lower portion of the bore of the plunger ring is widened somewhat as at 40 to prevent wedging of the glass between the plunger and the sides of the ring which wedging action might result in cutting or abrading the ring and plunger.

Before going further into the details of construction, the mode of operation of the parts thus far indicated will be described. With the main mold sections closed upon the bottom plate 12 and locked in closed position and the top font and plunger ring in place, as indicated in Fig. 1, the mold is filled with glass preferably to the line of the bottom edge of the plunger ring 38. The plunger 39 is then brought down to thoroughly spread the glass throughout the interior of the mold and to firm the same therein. During each operation some of the glass flows up into the annular cavity 40 of the plunger ring, so that the lower end of the plunger is embedded in the glass and the abrasive action of the glass between the plunger and the bore is prevented. After the glass is thoroughly spread within the mold, the plunger 39 is withdrawn, as shown in Fig. 2 and the valve actuating draw bar 17 is then drawn to the right, also as shown in Fig. 2 causing the withdrawal of the valve stem 21 within the valve head 16. This movement of the valve stem brings its passage 25 into register with the air inlet pipe 26 so that when the control cock 27 is open air under pressure enters the mold and drives the still molten portion of the glass at the center of the article upwardly forming a bubble or globe 41 within the plunger ring 38, thus forming a passage 42 within and longitudinally of the article or candlestick 43. The passage 42 may vary in diameter in different parts according to the varying thickness of the mass of glass throughout the length of the article. In any event a passage may be blown of sufficient diameter readily to receive the electrical conductors for the lamp. It will be seen also in the form of mold sections here illustrated that the lower ends of these sections are interiorly threaded as at 44 to form corresponding threads on what will be in the completed article the upper end of the candlestick for the ready reception of the threaded shank of the electric lamp.

In order to provide a passage extending from the central bore of the candlestick to the side thereof in order to permit of the lateral entrance of the electric conductors, a passage molding pin 45 is provided having a somewhat reduced end 46 adapted to project within the base forming portion 47 of the mold. This passage forming pin is slidably mounted in a guideway 48 in the mold section 2, and an actuating draw bar 49 is provided therefor having a cam slot 50 which engages a pin 51 fixed to the passage forming pin 45. By this construction and arrangement and after the glass has been cast within the mold and around this passage forming pin 45 and after the blowing operation has taken place, this passage forming pin may be withdrawn from the mold cavity to permit of ready removal of the article from the mold. Also after the mold and blowing operations have been performed the tapered valve head 19 may be withdrawn from the mold cavity by further movement of the valve actuating draw bar 17, which further action will cause a pin 29 of the valve head to travel down the inclined portion of the cam slot 28 and simultaneously the valve stem may be further withdrawn by travel of its cam pin 31 down the second inclined portion of the slot 30 in the draw bar, thereupon the mold sections may be opened and the article removed.

In order to bring the lateral passage forming pin 45 into communication with the central passage 42 of the candlestick the surplus neck portion 37 formed by the top font may be cracked off and thereupon the base of the candlestick or article is ground to concave form indicated by dotted line 52. This operation as will be seen from Fig. 2 opens direct communication between the longitudinal passage 42 of the candlestick and the lateral passage 45ᵃ formed by the lateral passage forming pin 45 whereby the electric conductor may be threaded through its lateral passage and into the central candlestick.

Referring now to the modified form of the construction illustrated in Fig. 5, the operation of casting the body portion of the candlestick and blowing the central passage therein may be as heretofore described. In order to form the lateral passage, however, the top font 34 has slidably mounted therein a lateral passage forming plunger or plate 53 which normally projects within the mold cavity of the top font as at 54 thus causing the formation of a lateral passage 55 in the base of the article or candlestick, so that when the base is ground, as at 52, as heretofore described, communication will be opened between this lateral passage 55 and the central passage 42 of the candlestick body. In order to withdraw the passage forming plunger 53 from engagement with the base of the candlestick, said plunger is provided with a cam slot 53ª engaged by an eccentric pin 56 mounted on a short stud 57 journaled in a bearing 58, said stud having a handle 59 by which said eccentric pin may be moved to actuate the plunger. From the above description it will be seen that the molding of the article and the formation of the longitudinal and lateral passages therein is carried out in one continued series of operations. Furthermore, the blowing of the central passage in the candlestick may be so regulated as to leave comparatively thick walls so that the appearance of a more or less massive crystal candlestick is secured. Furthermore, by forming the lateral passage as described, the complete passage from the side to the interior of the candlestick may be secured by the simple operation of grinding out the concave recess at the base of the candlestick, the formation of which recess at the same time secures the standard of the candlestick in the usual manner. It will be seen therefore that the production of the candlestick together with the passages necessary for the reception of electrical conductors may be carried out simultaneously thus securing both economy in production and at the same time the formation of the longitudinal and lateral passages in the candlestick do not detract from the ornamental appearance thereof.

What I claim is:

1. In glass molding and blowing apparatus, the combination with an article mold, a base plate therefor, and a top font, of a presser plunger operating in said font, a valve head projecting into said mold opposite said font having a valve therein, and means for opening said valve to blow a passage through said article after the withdrawal of the plunger.

2. In a glass molding and blowing apparatus, the combination of a mold, a base plate therefor, and a top font at the upper end of the mold, with a presser plunger operating in said font, a valve head operating through said base plate and having a valve stem, and means for immediately thereafter opening said valve to blow a passage through said article after the withdrawal of the plunger.

3. In a glass molding and blowing apparatus, the combination of a mold, a base plate therefor, and a top font at the upper end of the mold, with a presser plunger operating in said font, a valve head extending through said base plate, and having a valve stem therein, means for opening said valve to blow a passage through the article, and means for withdrawing the valve head from within said mold.

4. In a glass molding and blowing apparatus, the combination with a mold, a base plate therefor, and a top font at the upper end of the mold with a presser plunger operating in said font, of a valve head projecting into said mold through the base plate having a valve stem therein, means for opening said valve to blow a passage through said article, and means for forming a passage leading from the exterior of said article toward the upper end of said central passage.

5. In a glass molding and blowing apparatus, the combination with a mold, a base plate therefor, and a top font at the upper end of the mold with a presser plunger operating in said font, of a valve head projecting into said mold having a valve stem therein, means for opening said valve for blowing a passage longitudinally through said article, and means for forming a lateral depression extending toward the passage so formed.

6. In a glass molding and blowing apparatus, the combination of a mold, a base plate therefor, and a top font at the upper end of the mold with a presser plunger operating in said font, a valve head projecting into one end of said mold having a valve stem means for opening said valve to blow a passage extending longitudinally through said article, means for forcing a laterally extending passage within the article and leading toward said longitudinal passage.

7. In a glass molding and blowing apparatus, the combination of a mold, a base plate therefor, and a top font at the upper end of the mold with a presser plunger operating in said font, a plunger guide ring mounted in said font, means for withdrawing said plunger from the guide ring, a valve head projecting into the opposite end of said mold having a valve stem therein, means for opening said valve to blow a passage longitudinally through said article and to carry the surplus glass in the form of a bubble into said plunger ring, a passage forming member constructed and arranged to form a passage extending laterally in the article toward said first-named longitudinal passage.

8. In a glass molding and blowing apparatus, the combination of a mold, a base plate therefor, and a top font at the upper end of the mold with a presser plunger operating in said font, a shiftable valve head operating through said base plate having a valve stem therein, an actuating bar operating transversely of said valve head, and having means to open said valve to blow a passage through said article and having means to thereafter withdraw said valve head and valve from the mold.

9. In a glass molding and blowing apparatus, the combination of a mold, a base plate therefor, and a top font at the upper end of the mold with a presser plunger operating in said font, a shiftable valve head operating through said base plate having a valve stem therein, an actuating bar operating transversely of said valve head, and having means to open said valve to blow a passage through said article and having means to thereafter withdraw said valve head and valve from the mold, and a laterally shiftable plunger operating through the side of the mold to form a lateral passage in the base.

10. In a glass molding and blowing apparatus, the combination of an article mold, a base plate therefor, a top font, a plunger operating in said font, a valve head projecting into the end opposite to said font and adapted to blow a longitudinal passage through the article after the removal of the font, and means for forming a lateral passage in the article extending from its outer face toward the longitudinal passage so blown through the article.

11. In a glass molding and blowing apparatus, the combination of a sectional article mold, a base plate carrying the sections of said mold and located at the lower end thereof, a top font overlying the upper end of said mold, means for blowing a passage longitudinally through the molded article in the mold, and means for forming a passage laterally through one end of the molded article, at a point adjacent said longitudinal passage.

12. In a glass molding and blowing apparatus, the combination of a mold sectioned longitudinally, a base plate carrying the mold sections and located at the lower end of the mold cavity, means operating from said base plate to blow a passage longitudinally through the article, a top font overlying the upper end of said mold, a plunger operating in said font to compress the glass within the mold, means for withdrawing said plunger, and a second plunger adapted to operate through the side of the mold cavity near the upper end thereof to open a lateral passage to a point adjacent said longitudinal passage.

13. In a glass molding and blowing apparatus, the combination of a mold composed of longitudinal sections, a base plate carrying said mold sections, a valve head plunger operating through said base plate having a valve stem therein, a top font overlying the upper ends of said mold section, a presser plunger operating in said top font, a valve actuating draw bar operating transversely through the base of the mold, and having cam connections with said valve head plunger and said valve stem whereby said valve may be opened by said draw bar to blow a passage longitudinally through the molded article and whereby said valve head may thereafter be withdrawn from the mold cavity, and a plunger operating in the upper end of the mold to form a lateral passage extending from the outer surface of the article into proximity with said central passage, means for actuating said last named plunger to withdraw the same from the mold cavity.

In testimony whereof, I the said ANDREW J. SANFORD have hereunto set my hand.

ANDREW J. SANFORD.

Witnesses:
  MAX B. NORPELL,
  GEORGE A. BLOOD.